United States Patent
Kato et al.

(10) Patent No.: US 7,304,820 B2
(45) Date of Patent: Dec. 4, 2007

(54) METHOD OF POSITIONING DISK-SHAPED MEDIUM

(75) Inventors: Toshiya Kato, Kawasaki (JP); Terushige Arai, Kawasaki (JP); Masanori Fukushi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 860 days.

(21) Appl. No.: 10/646,224

(22) Filed: Aug. 22, 2003

(65) Prior Publication Data

US 2004/0034992 A1    Feb. 26, 2004

(30) Foreign Application Priority Data

Aug. 26, 2002   (JP) ............... 2002-245439

(51) Int. Cl.
*G11B 17/02* (2006.01)
*G11B 5/012* (2006.01)

(52) U.S. Cl. ............... 360/99.08; 360/71; 360/98.01; 29/603.03

(58) Field of Classification Search .............. None
See application file for complete search history.

(56) References Cited

U.S. PATENT DOCUMENTS 6,655,244 B2 * 12/2003 Shiraishi et al. ............. 82/1.11

2004/0095669 A1 *  5/2004 Yoo et al. ............. 360/71
2004/0194291 A1 * 10/2004 Pfeiffer et al. ........... 29/603.03
2006/0066994 A1 *  3/2006 Suzuki et al. ............ 360/99.08

FOREIGN PATENT DOCUMENTS

JP    7-220385    8/1995
JP    10-255362    9/1998

* cited by examiner

*Primary Examiner*—Andrew L. Sniezek
(74) *Attorney, Agent, or Firm*—Greer, Burns & Crain, Ltd.

(57) ABSTRACT

The method of positioning a disk-shaped medium is capable of precisely positioning the center of the disk-shape medium with respect to a center of a rotary shaft. The method comprises the steps of: inserting a cylindrical hub into a center hole of the disk-shaped medium; and covering a hub adaptor, which is eccentrically fixed to a rotary shaft, with the hub so as to position the disk-shaped medium on the rotary shaft. Directions of eccentricity of the disk-shaped medium, the hub and a hub unit are defined on the basis of amount of eccentricity between the disk-shaped medium and the hub, that between the hub and the hub adaptor and that between the hub adaptor and the rotary shaft.

6 Claims, 4 Drawing Sheets

METHOD OF POSITIONING DISK-SHAPED MEDIUM

BACKGROUND OF THE INVENTION

The present invention relates to a method of positioning a disk-shaped medium, which is capable of precisely positioning the disk-shaped medium on a rotary shaft.

A conventional method will be explained with reference to FIGS. 5A and 5B. FIG. 5A is an explanation view (a plan view) of a servo track writer and FIG. 5B is an explanation view (a sectional view) thereof, in each of which a plurality of disk-shaped media 10 have been set. A plurality of disk-shaped media 10 are piled to cover a hub 12 with regular separations and arranged in the axial direction of the hub 12. The hub 12 is connected to a motor 16 with a hub adaptor 14, and the hub 12 is rotated by the motor 16. With this structure, servo track data can be written on the disk-shaped media 10 by a writing head of a recording apparatus.

In the apparatus for writing servo track data on the disk-shaped media 10 which have been attached to the hub 12, centers of the disk-shaped media 10 must be correctly coincided with a rotational axis of the motor 16.

However, clearances must be formed between the disk-shaped media 10 and the hub 12 when the disk-shaped media 10 are set on the hub 12. Further, a clearance must be formed between the hub 12 and the hub adaptor 14 when the hub 12 is attached to the hub adaptor 14. Therefore, errors caused by the clearances must be removed so as to correctly coincide the centers of the disk-shaped media 10 with the rotational axis of the motor 16.

Conventionally, when the disk-shaped media 10 are attached to the hub 12, the disk-shaped media 10 are biased from the right so as to shift the centers of the disk-shaped media 10 leftward with respect to the center of the hub 12. On the other hand, when the hub 12 is attached to the hub adaptor 14, the hub is biased from the left so as to shift the center of the hub 12 rightward with respect to the center of the hub adaptor 14. With this method the clearances disappear and the centers of the disk-shaped media 10 can coincide with the center of the rotational axis of the motor 16.

In the conventional method, the centers of the disk-shaped media 10 are shifted in one direction with respect to the center of the hub 12; the center of the hub 12 is shifted in the opposite direction with respect to the center of the hub adaptor 14. With their eccentricity, the centers of the disk-shaped media 10 can be coincided with the rotational axis of the motor 16. However, if manufacturing accuracy of the disk-shaped media 10 is much lower than that of other members, the clearances cannot be absorbed. Namely, the centers of the disk-shaped media 10 cannot coincide with the rotational axis of the motor 16. Therefore, in the conventional method shown in FIGS. 5A and 5B, manufacturing accuracy of the disk-shaped media 10 and other members must be high.

As described above, in the conventional method shown in FIGS. 5A and 5B, the disk-shaped media are precisely positioned on the rotary shaft by using the amount of eccentricity.

However, in servo track writers of some magnetic disk drive units, the centers of the disk-shaped media merely coincide with the center of the hub. Then, the centers of the disk-shaped media are correctly positioned when they are assembled in the disk drive unit.

In the case of using a plurality of types of the disk-shaped media, inner diameters of the center holes are not fixed, so the conventional hub cannot be used. To overcome this problem, a new hub corresponding to the different types of the media must be prepared, or the conventional hub must be machined so as to correspond to the different types of the media.

However, preparing the new hub and machining the conventional hub are troublesome, so that manufacturing efficiency must be lower and manufacturing cost must be higher. Since the hub for the servo track writer must be machined precisely and it must be prepared for each servo track writer, preparing a new hub much increases the manufacturing cost.

SUMMARY OF THE INVENTION

An object of the present invention is to provide a method of positioning a disk-shaped medium, which is capable of precisely positioning the center of the disk-shape medium with respect to a center of a rotary shaft and which is capable of correctly positioning a plurality of the disk-shaped media whose center holes have different inner diameters, without exchanging a hub so that the disk-shaped media can be precisely and efficiently positioned.

To achieve the object, the method of the present invention comprises the steps of: inserting a cylindrical hub into a center hole of the disk-shaped medium; and covering a hub adaptor, which is eccentrically fixed to a rotary shaft, with the hub so as to position the disk-shaped medium on the rotary shaft, characterized in that directions of eccentricity of the disk-shaped medium, the hub and a hub unit are defined on the basis of amount of eccentricity between the disk-shaped medium and the hub, that between the hub and the hub adaptor and that between the hub adaptor and the rotary shaft, whereby the center of the disk-shaped medium with respect to the rotary shaft is positioned at a prescribed position.

In the method, for example, the amount and the direction of eccentricity of the disk-shaped medium with respect to the rotary shaft are defined by biasing the disk-shaped medium toward the hub and making an inner face of the center hole of the disk-shaped medium contact with an outer face of the hub; the amount and the direction of eccentricity of the hub respect to the hub adaptor are defined by biasing the hub toward the hub adaptor and making an inner face of the hub contact with an outer face of the hub adaptor; and the directions of eccentricity of the disk-shaped medium, the hub and the hub unit are defined by rotating the hub adaptor, without fixing the hub to the hub adaptor, in a prescribed angle with respect to the rotary shaft.

In the method, for example, the rotary shaft is rotated by a motor; and rotational angle of the rotary shaft is controlled by a motor driver so as to rotate the hub adaptor in the prescribed angle.

In the method, for example, amount of correcting the eccentric directions of the disk-shaped medium, the hub and the hub adaptor in are calculated on the basis of dimensions of the disk-shaped medium, dimensions of parts of the hub and the hub adaptor, and the amount of the eccentricity of the hub adaptor with respect to the rotary shaft, and the amount of correcting the eccentric directions are inputted to the motor driver so as to correctly position the disk-shaped medium.

In the method, for example, a plurality of the disk-shaped media are biased toward the hub from the same direction so as to simultaneously position the disk-shaped media.

In the method, for example, the center of the disk-shaped medium is positioned with respect to the rotary shaft by adjusting two of the amount of eccentricity between the disk-shaped medium and the hub, that between the hub and the hub adaptor and that between the hub adaptor and the rotary shaft.

By using the method of the present invention, the center of the disk-shaped medium can be correctly positioned with respect to the rotary shaft of the motor, etc. The method can be effectively used for setting the disk-shaped medium or media in a device, e.g., a servo track writer. Further, in the case of setting a plurality of types of the disk-shaped media whose center holes have different inner diameters, the disk-shaped media can be correctly positioned without machining the hub or preparing a new hub.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

Figure 1:
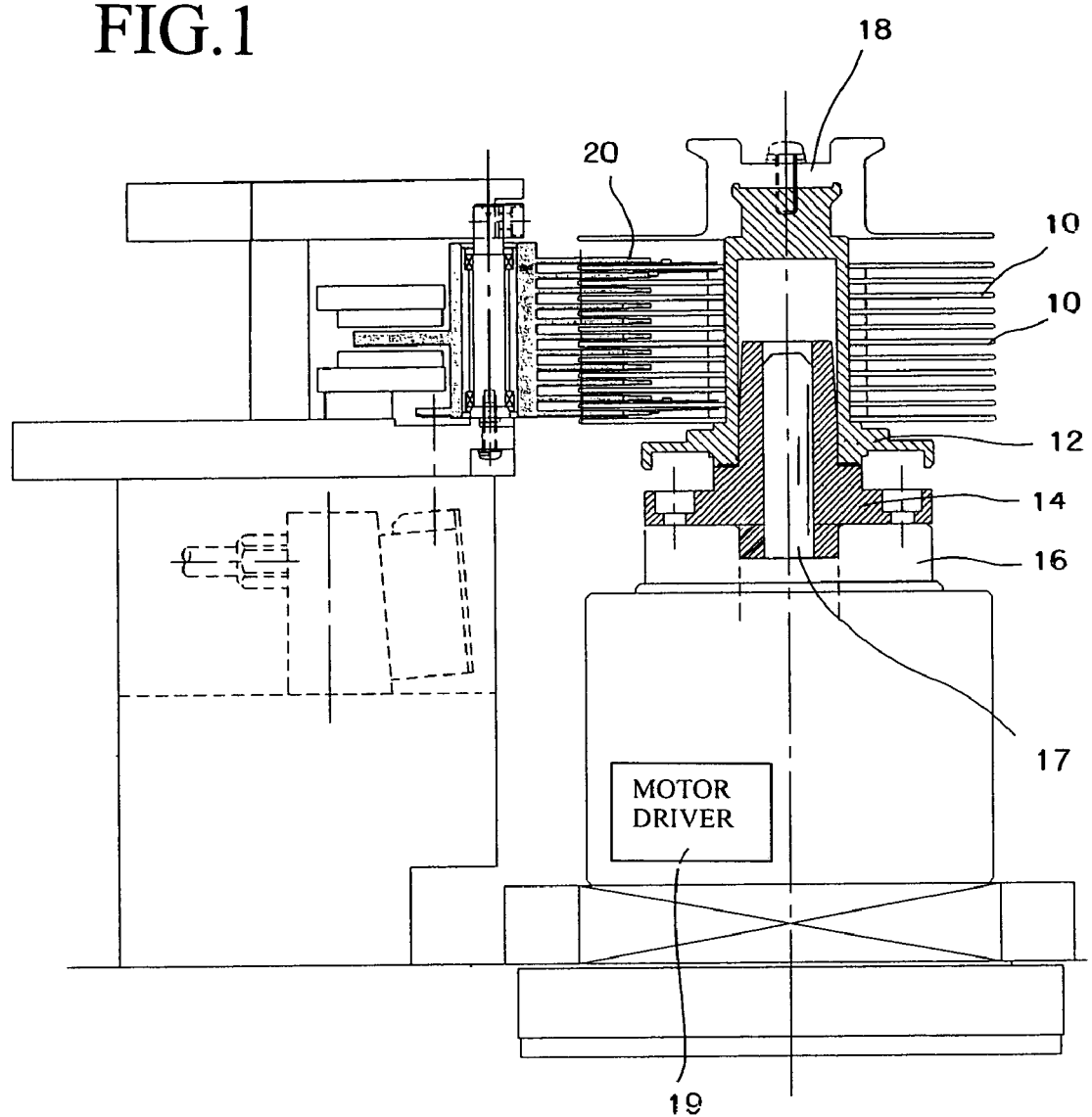
FIG. 1 is an explanation view of an apparatus in which disk-shaped media are set by the method of the present invention.

In FIG. 1, a plurality of disk-shaped media 10 are set in a servo track writer. The disk-shaped media 10 are correctly positioned by the method of the present invention. The disk-shaped media 10 are held by a hub 12. The hub 12 is inserted in center holes of the disk-shaped media 10. The disk-shaped media 10 are piled with spacers. By the spacers, the adjacent disk-shaped media 10 are separated with a predetermined separation. The disk-shaped media 10, which have been attached to the hub 12, is biased toward the hub 12 so as to make an inner face of the center hole of the disk-shaped media 10 contact with an outer face of the hub 12, so that the disk-shaped media 10 are eccentrically positioned with respect to the hub 12. A fixing member 18 is fixed on a top part of the hub 12 by a screw so as to eccentrically hold the disk-shaped media 10 with respect to a center of the hub 12.

A hub adaptor 14 has been previously eccentrically fixed to a motor 16. The hub 12, to which the disk-shaped media 10 have been eccentrically attached by the fixing member 18, covers the hub adaptor 14. When the hub 12 is fixed to the hub adaptor 14, the hub 12 is eccentrically attached with respect to the hub adaptor 14.

As described above, the position of the hub adaptor 14 with respect to the motor 16, the position of the hub 12 with respect to the hub adaptor 14 and the position of the disk-shaped media 10 with respect to the hub 12 are defined, so that the positions of the disk-shaped media 10 with respect to the motor 16 are defined.

Writing heads 20 write servo track data on the disk-shaped media 10. A couple of writing heads 20 are assigned to each disk-shaped medium 10. Each writing head 20 enters a space between the adjacent disk-shaped media 10 so as to write the servo track data on the disk-shaped media 10.

The method of positioning the disk-shaped media 10 of the present embodiment is characterized in that the positional relationship between the motor 16 and the hub adaptor 14, the positional relationship between the hub adaptor 14 and the hub 12 and the positional relationship between the hub 12 and the disk-shaped media 10 are adjusted so as to optionally position the centers of the disk-shaped media 10 with respect to the center (the rotational axis) of the motor 16.

Figure 2:
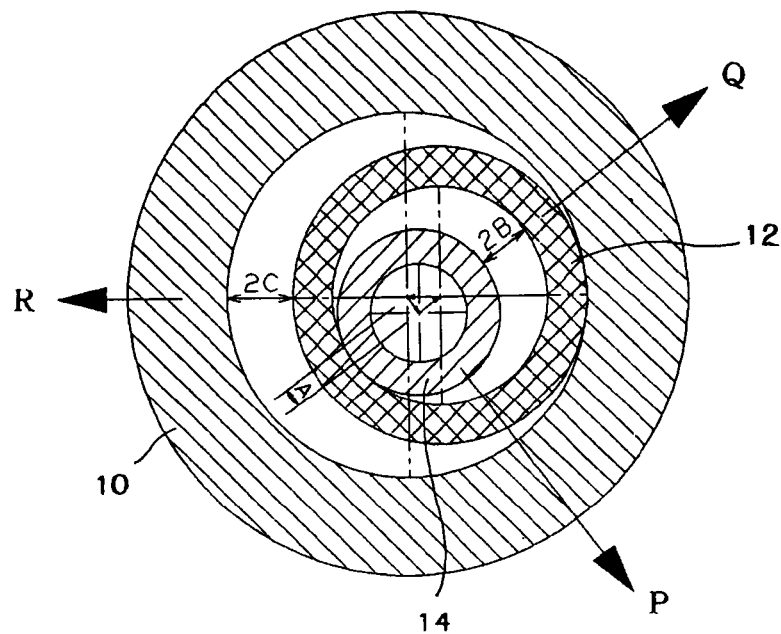
FIG. 2 is an explanation view of an arrangement of the disk-shaped medium, a hub and a hub adaptor.

An example of an arrangement of the disk-shaped medium 10, the hub 12 and the hub adaptor 14 is shown in FIG. 2. The hub adaptor 14 is eccentrically arranged "A" μm in a direction "P" with respect to the rotational axis of the motor 16. An inner diameter of a center hole of the hub 12 is "2B" μm greater than an outer diameter of the hub adaptor 14, and the hub 12 is eccentrically arranged "B" μm in a direction "Q" with respect to the hub adaptor 14. Further, an inner diameter of the center hole of the disk-shaped medium 10 is "2C" μm greater than an outer diameter of the hub 12, and the disk-shaped medium 10 is eccentrically arranged "C" μm in a direction "R" with respect to the hub 12. The hub 12 is biased toward the direction "Q" with respect to the hub adaptor 14, and the disk-shaped medium 10 is biased toward the direction "R" with respect to the hub 12. Therefore, the amount of eccentricity of the hub 12 is one half of the difference between the inner diameter of the hub 12 and the outer diameter of the hub adaptor 14; the amount of eccentricity of the disk-shaped medium 10 is one half of the difference between the inner diameter of the disk-shaped medium 10 and the outer diameter of the hub 12.

If diameter differences exist among the members as shown in FIG. 2, the center of the disk-shaped medium 10 can coincide with the rotational axis of the motor 16 by adjusting the directions of eccentricity of the disk-shaped medium 10, the hub 12 and the hub adaptor 14. This method will be explained with reference to FIG. 3.

Figure 3:
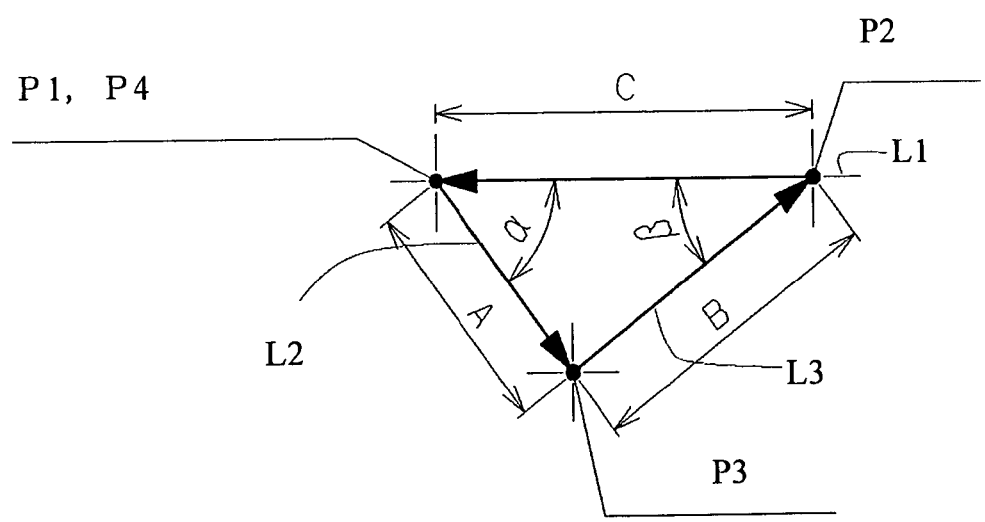
FIG. 3 is an explanation view of an arrangement of centers of the disk-shaped medium, a rotary shaft, the hub and the hub adaptor.

In FIG. 3, a standard line "L1" connects the center "P1" of the disk-shaped medium 10 to the center "P2" of the hub 12. A line "L2" connecting the center "P1" of the disk-shaped medium 10 to the center "P3" of the hub adaptor 14 is inclined angle "α" with respect to the standard line "L1", and the amount of eccentricity of the center "P3" of the hub adaptor 14 with respect to the center "P1" of the disk-shaped medium 10 is "A" μm. Further, a line "L3" connecting the center "P2" of the hub 12 to the center "P3" of the hub adaptor 14 is inclined angle "β" with respect to the standard line "L1", and the amount of eccentricity of the center "P3" of the hub adaptor 14 with respect to the center "P2" of the hub 12 is "B" μm.

Namely, the amount of eccentricity "A" μm between the motor 16 and the hub adaptor 14, the amount of eccentricity "B" μm between the hub adaptor 14 and the hub 12 and the amount of eccentricity "C" μm between the hub 12 and the disk-shaped medium 10 are previously given, so the angles "α" and "β" should be adjusted so as to make the sum of eccentric vectors zero. With this adjustment, the center "P1" of the disk-shaped medium 10 can be coincided with the rotational axis "P4" of the motor 16 as shown in FIG. 3.

The angles "α" and "β" are indicated as following formulas:

$$\alpha = \cos^{-1}((A^2 - B^2 + C^2)/2AC)$$

$$\beta = \cos^{-1}((-A^2 + B^2 + C^2)/2BC)$$

When the amount of eccentricity "A", "B" and "C" are given, the directions "P", "Q" and "R" of eccentricity of the disk-shaped medium 10, the hub 12 and the hub adaptor 14 should be defined on the basis of the formulas so as to coincide the center of the disk-shaped medium 10 with the rotational axis of the motor 16. An example will be explained with reference to FIGS. 4A-4B.

Figure 4A:
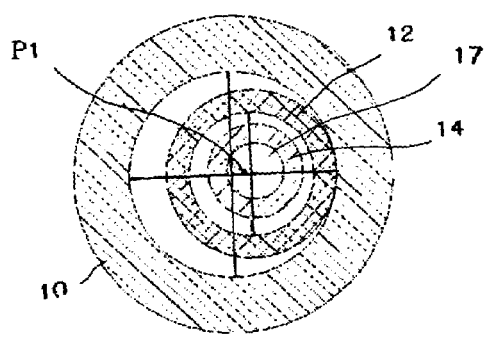
FIGS. 4A-4D are explanation views showing the steps of positioning and setting the disk-shaped medium.
Figure 4B:
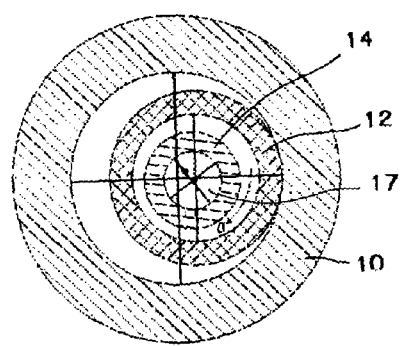

FIGS. 4A-4B show the steps of setting the hub adaptor 14, the hub 12 and the disk-shaped media 10. Note that, one disk-shaped medium 10 is shown in each of FIGS. 4A-4B, but a plurality of the disk-shaped media 10 are actually set in the servo track writer.

FIG. 4A shows a state in which the hub 12, to which the disk-shaped media 10 have been eccentrically attached, covers the hub adaptor 14. All of the disk-shaped media 10 have been biased in one direction with respect to the hub 12. The biased disk-shaped media 10 are held by the hub 12. The hub 12 is set to the hub adaptor 14. The disk-shaped media 10 are eccentrically arranged with the eccentric angle (the direction of eccentricity) of 180° with respect to the rotational axis of the motor 16. Note that, the hub adaptor 14 has been previously biased rightward and fixed to a rotary shaft 17 of the motor 16. The amount of eccentricity of the hub adaptor 14 with respect to the rotational axis of the rotary shaft of the motor 16 is "A" μm.

FIG. 4B shows a state in which the rotary shaft 17 of the motor 16 is rotated at an angle "α" in the clockwise direction. Note that, the hub 12 mounted on the hub adaptor 14 is not rotated. Since the hub adaptor 14 is fixed to the rotary shaft 17 of the motor 16, the hub adaptor 14 is rotated together with the rotary shaft 17 of the motor 16. Therefore, the center of the hub adaptor 14 is angularly moved "α" with respect to the rotational axis of the motor 16. In the above described example, the hub adaptor 14 is mounted on the hub 12, and the rotary shaft 17 of the motor 16 is rotated in the angle "α". In another case, the rotary shaft 17 of the motor 16 may be rotated as shown in FIG. 4B after the hub adaptor 14 is set on the rotary shaft 17, then the hub 12 holding the disk-shaped media 10 may be set as shown in FIG. 4B.

Figure 4C:
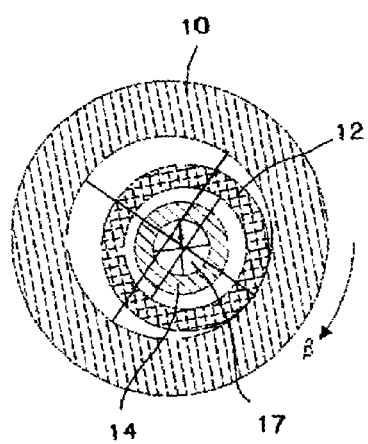

FIG. 4C shows a state in which the rotary shaft 17 of the motor 16 is rotated at an angle "β" in the clockwise direction without changing relative positional relationship among the hub 12, the disk-shaped media 10 and the hub adaptor 14. With this step, the hub adaptor 14, the hub 12 and the disk-shaped media 10 are integrally rotated in the angle "β" with respect to the rotational axis of the rotary shaft 17 of the motor 16.

Figure 4D:
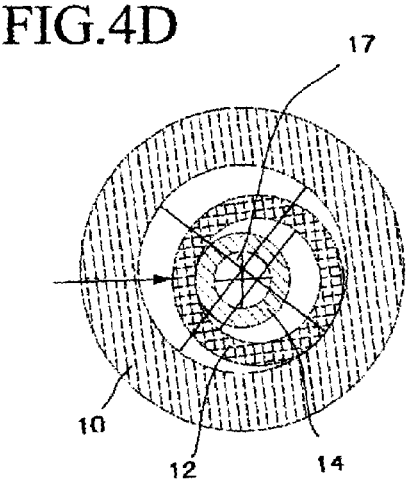
Figure 5A:
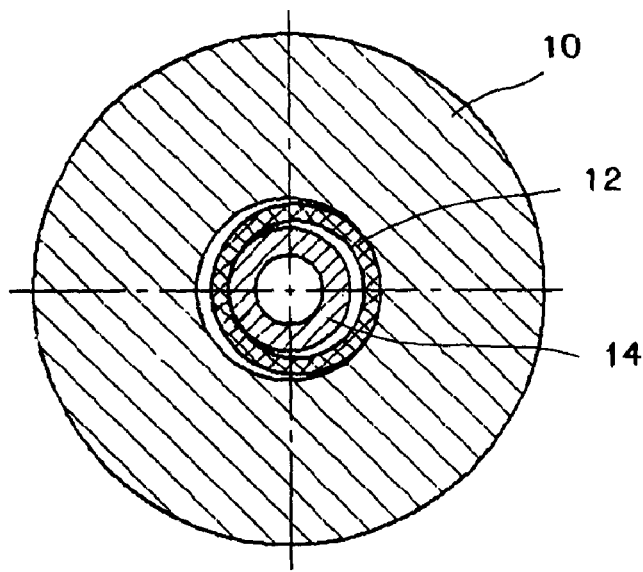
FIGS. 5A and 5B are explanation views showing the conventional method of positioning the disk-shaped media.
Figure 5B:
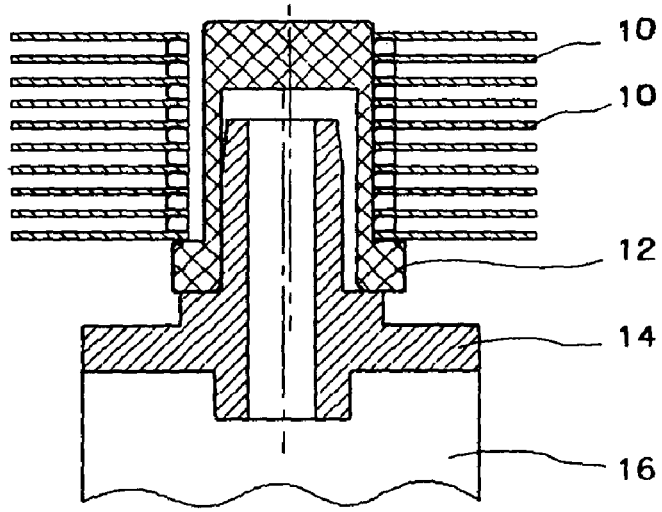

In FIG. 4D, the hub 12 is finally pushed or biased rightward so as to make the inner face of the hub 12 contact with the outer face of the hub adaptor 14. The hub 12 is fixed to the hub adaptor 14 in that state. By the action shown in FIG. 4D, the disk-shape media 10 are moved until their centers coincide with the rotational axis of the rotary shaft 17 of the motor.

In the method shown in FIGS. 4A-4D, the centers of the disk-shaped media 10 can coincide with the rotational axis of the rotary shaft 17 of the motor 16 when the directions of eccentricity of the hub adaptor 14, the hub 12 and the disk-shaped media 10 on the basis of the given amounts of eccentricity "A", "B" and "C". This method can be wide-used. Even if inner diameters of the hub adaptor 14, the hub 12 and/or the disk-shaped media 10 are changed, the centers of the disk-shaped media 10 can coincide with the rotational axis of the rotary shaft 17 of the motor 16. To correctly set the hub adaptor 14, the hub 12 and the disk-shaped media 10, the rotary shaft 17 of the motor 16 must be rotated in prescribed angles, but the rotation can be optionally controlled by a motor driver 19. By employing the motor driver 19, the disk-shaped media 10 can be precisely and efficiently set.

In the case of changing the inner diameters of the disk-shaped media 10 according to types or lots of products, the inner diameters of the disk-shaped media 10 are measured when the disk-shaped media 10 are changed. Then, the directions of eccentricity of the disk-shaped media 10, the hub 12 and the hub adaptor 14 are calculated again on the basis of the measured inner diameters, so that amount of correcting the eccentric directions thereof are gained. The amount of correcting the eccentric directions are inputted to the motor driver 19 for feedback control. With this control, the disk-shaped medium 10 can be correctly positioned even if the disk-shaped media 10 are changed. In the case of changing lots of products, the diameter difference between the lots is very small, the changed disk-shaped media 10 can be efficiently positioned by the feedback control of the motor driver 19. Though deviations of the inner diameter of the disk-shaped media are frequently occurred, the positions of the disk-shaped media can be effectively and precisely corrected by the feedback control.

In the above described embodiment, the center of the disk-shaped medium or media 10 coincides with the rotational axis of the rotary shaft 17 of the motor 16. However, the present invention is not limited to the embodiment. For example, in the case of positioning the center of the disk-shaped medium or media 10 in a prescribed zone which is radially extended from the rotational axis of the motor 16, the disk-shaped medium or media 10 can be correctly positioned therein by defining the angles "α" and "β" (see FIG. 3) and executing the steps shown in FIGS. 4A-4D.

In the conventional method, a new hub or a newly machined hub must be prepared when the inner diameter of the disk-shaped medium or media are changed. On the other hand, in the method of the present invention, the disk-shaped medium or media can be correctly positioned by the above described steps without using a new hub or a newly machined hub. Therefore, the positioning work can be efficiently executed, and cost of assembling disk drive units can be much reduced. Especially, in the case of using many types of disk-shaped media, it is very advantageous to correctly position the disk-shaped media by adjusting the positions of the hub 12, the hub adaptor 14, etc. If the inner diameters of the disk-shaped media are not fixed, the deviations can be absorbed by adjusting the positions, so that the disk-shaped media can be correctly positioned.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. A method of positioning a disk-shaped medium, comprising the steps of:
   inserting a cylindrical hub into a center hole of the disk-shaped medium; and
   covering a hub adaptor, which is eccentrically fixed to a rotary shaft, with the hub so as to position the disk-shaped medium on the rotary shaft; and determining eccentricity between the disk-shaped medium and the rotary shaft such that directions of eccentricity of the disk-shaped medium, the hub and a hub unit are calculated on the basis of a first amount of eccentricity between the disk-shaped medium and the hub, a second amount of eccentricity between the hub and the hub adaptor, and a third amount of eccentricity between the hub adaptor and the rotary shaft, whereby the center of the disk-shaped medium with respect to the rotary shaft is positioned at a prescribed position based on the first, second and third amounts of eccentricity.

2. A method of positioning a disk-shaped medium, comprising the steps of:

inserting a cylindrical hub into a center hole of the disk-shaped medium; and covering a hub adaptor, which is eccentrically fixed to a rotary shaft, with the hub so as to position the disk-shaped medium on the rotary shaft, characterized in that directions of eccentricity of the disk-shaped medium, the hub and a hub unit are defined on the basis of amount of eccentricity between the disk-shaped medium and the hub, that between the hub and the hub adaptor and that between the hub adaptor and the rotary shaft, whereby the center of the disk-shaped medium with respect to the rotary shaft is positioned at a prescribed position, wherein the amount and the direction of eccentricity of the disk-shaped medium with respect to the rotary shaft are defined by biasing the disk-shaped medium toward the hub and making an inner face of the center hole of the disk-shaped medium contact with an outer face of the hub, the amount and the direction of eccentricity of the hub with respect to the hub adaptor are defined by biasing the hub toward the hub adaptor and making an inner face of the hub contact with an outer face of the hub adaptor, and the directions of eccentricity of the disk-shaped medium, the hub and the hub unit are defined by rotating the hub adaptor, without fixing the hub to the hub adaptor, in a prescribed angle with respect to the rotary shaft.

3. The method according to claim 2, wherein the rotary shaft is rotated by a motor, and rotational angle of the rotary shaft is controlled by a motor driver so as to rotate the hub adaptor in the prescribed angle.

4. The method according to claim 3, wherein amount of correcting the eccentric directions of the disk-shaped medium, the hub and the hub adaptor are calculated on the basis of dimensions of the disk-shaped medium, dimensions of parts of the hub and the hub adaptor, and the amount of the eccentricity of the hub adaptor with respect to the rotary shaft, and the amount of correcting the eccentric directions are inputted to the motor driver so as to correctly position the disk-shaped medium.

5. The method according to claim 2, wherein a plurality of the disk-shaped media are biased toward the hub from the same direction so as to simultaneously position the disk-shaped media.

6. The method according to claim 2, wherein the center of the disk-shaped medium is positioned with respect to the rotary shaft by adjusting two of the amount of eccentricity between the disk-shaped medium and the hub, that between the hub and the hub adaptor, and that between the hub adaptor and the rotary shaft.

* * * * *